United States Patent
Alsohaily et al.

(10) Patent No.: US 10,009,946 B2
(45) Date of Patent: Jun. 26, 2018

(54) SYSTEM AND METHOD FOR WIRELESS USER EQUIPMENT ACCESS

(71) Applicants: Ahmed Alsohaily, Toronto (CA);
Elvino Silveira Medina de Sousa, Toronto (CA)

(72) Inventors: Ahmed Alsohaily, Toronto (CA);
Elvino Silveira Medina de Sousa, Toronto (CA)

(*) Notice: Subject to any disclaimer, the term of this patent is extended or adjusted under 35 U.S.C. 154(b) by 0 days. days.

(21) Appl. No.: 15/169,821

(22) Filed: Jun. 1, 2016

(65) Prior Publication Data
US 2017/0353977 A1 Dec. 7, 2017

(51) Int. Cl.
*H04W 72/00* (2009.01)
*H04W 76/10* (2018.01)
*H04W 76/02* (2009.01)
*H04W 28/06* (2009.01)
*H04W 16/04* (2009.01)
*H04W 88/06* (2009.01)
*H04W 88/08* (2009.01)

(52) U.S. Cl.
CPC ........... *H04W 76/10* (2018.02); *H04W 16/04* (2013.01); *H04W 28/06* (2013.01); *H04W 76/02* (2013.01); *H04W 88/06* (2013.01); *H04W 88/08* (2013.01)

(58) Field of Classification Search
CPC ..... H04W 16/10; H04W 16/14; H04W 16/28; H04W 48/18; H04W 28/16; H04W 72/04; H04W 76/02; H04W 88/02; H04W 88/06; H04W 88/08; H04W 88/085

USPC .......................... 455/450, 552.1, 553.1, 561
See application file for complete search history.

(56) References Cited

U.S. PATENT DOCUMENTS

| | | | | |
|---|---|---|---|---|
| 2013/0273916 | A1* | 10/2013 | Gupta | H04W 36/34 455/436 |
| 2015/0181614 | A1* | 6/2015 | Mitra | H04W 56/004 370/350 |
| 2015/0208274 | A1* | 7/2015 | Himayat | H04N 21/2365 370/230 |
| 2016/0029345 | A1* | 1/2016 | Sebeni | H04B 1/7115 370/281 |
| 2017/0104562 | A1* | 4/2017 | Doken | H04L 5/0037 |

OTHER PUBLICATIONS

"What is the Download Booster and how do I enable it on my Samsung Galaxy Alpha?", <http://www.samsung.com/uk/support/skp/faq/1061358>, retrieved Aug. 30, 2016.

* cited by examiner

*Primary Examiner* — Temica M Beamer
(74) *Attorney, Agent, or Firm* — Marc Lampert; Anil Bhole; Bhole IP Law

(57) ABSTRACT

A system and method for wireless user equipment access in a cellular wireless communication system, employing a single or plurality of Radio Access Technologies (RATs), is provided. The method based on configuring User Equipment (UE) capable of utilizing multiple RATs to simultaneously utilize all or a subset of RATs jointly supported by UE and connecting system radio Access Points (APs), with traffic split between utilized RATs facilitated by either the Radio Access Network (RAN) or UE, and UE facilitating the aggregation of traffic streams of utilized RATs.

17 Claims, 8 Drawing Sheets

SYSTEM AND METHOD FOR WIRELESS USER EQUIPMENT ACCESS

TECHNICAL FIELD

The following relates generally to wireless communication system operation and spectrum access and more specifically to the configuration of user equipment access to system radio frequency resources.

BACKGROUND

Specific radio frequency bands are set aside for wireless cellular communications by spectrum regulatory authorities (such as the Federal Communications Commission in the United States of America) to ensure the reliable operation of cellular communication systems, and are referred to as cellular bands. The term 'spectrum' is commonly used to refer to the aggregate bands that are assigned to the cellular communication network, also referred to as the cellular communication system, in any given jurisdiction. Another analogous phrase to spectrum is radio frequency resources.

Cellular bands can be contiguous or non-contiguous and are typically divided into sub-bands, which again can be contiguous or non-contiguous, that are licensed to mobile network operators. A mobile network operator thus deploys the network infrastructure of a cellular communication system, typically comprising a Radio Access Network (RAN) and a Core Network (CN), upon obtaining a spectrum utilization license, i.e. a license to use a particular cellular band or sub-band. Connection of User Equipment (UE) to system radio Access Points (AP) of the network infrastructure is facilitated by a wireless radio air interface, referred to as the Radio Access Technologies (RAT), which utilizes a specific amount of spectrum commonly measured by the transmission bandwidth.

RATs are characterized by the required transmission bandwidth, transmission frame duration, frequency reuse factor between system radio APs, user multiple access scheme, modulation and coding configurations along with the transmission and reception protocols. Due to the limited amount of spectrum available for cellular systems, RATs are typically designed with the objective of enabling maximal spectrum reuse at all system radio APs while having the highest possible spectral efficiency.

In terms of RAT support, UE broadly fall into one of two categories: Single Mode User Equipment (SMUE), capable of utilizing a single RAT only, and Multimode User Equipment (MMUE), capable of utilizing multiple RATs. Multiple RATs are primarily deployed at system radio APs in cellular communication systems to accommodate variations in the capabilities of UE and maintain connectivity of SMUE. Each system radio AP could support one or more RATs and available bands or sub-bands are generally partitioned between RATs when deploying multiple RATs at system radio APs covering the same geographical areas. MMUE also support multiple RATs to maintain UE connectivity when connecting to system radio APs supporting a single RAT or multiple RATs that are inferior to the highest performing RAT supported by the MMUE.

When connecting to system radio APs, UE are typically configured to utilize a single RAT only at any time. Such a mode of operation is referred to herein as Single-Mode Access (SMA). MMUE are thus limited under SMA to utilizing a single RAT even when connecting to system radio APs deploying multiple RATs. When connecting to system radio APs deploying multiple RATs under the restriction of SMA, MMUE are typically configured to utilize the highest performing RAT jointly supported by MMUE and the connecting system radio APs, referred to as the primary mode of operation, and MMUE configuration is typically capable of adapting the utilized RAT as MMUE connect to different system radio APs as well as when the connectivity requirements of user applications change. Nevertheless, configuring MMUE to utilize a single RAT only when connecting to system radio APs deploying multiple RATs can result in the suboptimal utilization of system radiofrequency resources, MMUE capabilities and the capabilities of system radio APs.

When connecting system radio APs utilizing a single RAT over multiple bands, UE may simultaneously utilize (i) all bands jointly supported by UE and connecting system radio APs; or (ii) a subset of bands jointly supported by UE and connecting system radio APs. In the latter case, UE may not utilize all bands jointly supported by UE and connecting system radio APs for various reasons that include, but are not limited to, connectivity requirements of user applications that may not be fulfilled at certain bands or are better fulfilled by other bands, energy efficiency considerations and UE hardware or processing limitations. Traffic split mechanisms include, but are not limited to, sequential and weighted traffic split. Under sequential traffic split, traffic demand is steered at a designated band and traffic demand exceeding the capacity of the designated band is steered at another designated band and so on. On the other hand, weighted traffic split divides traffic between bands based on band capacity, such that bands providing equal capacity would carry equal amounts of traffic.

SUMMARY

Multimode User Equipment (MMUE) connecting to system radio Access Points (APs) deploying multiple Radio Access Technologies (RATs) are configured to simultaneously utilize all or a subset of RATs jointly supported by MMUE and connecting system radio APs in a mode of operation referred to herein as Multimode Access (MMA).

In one implementation of MMA, connectivity application software of the MMUE transceiver module is configured to determine a set of RATs jointly supported by the MMUE and connected AP, establish a communication link with the AP utilizing all or a subset of the jointly supported RATs, aggregate the traffic streams of simultaneously utilized RATs and perform traffic split between simultaneously utilized RATs based on traffic splitting priorities.

In another implementation of MMA, the connectivity application software of the MMUE transceiver module is configured to determine a set of RATs jointly supported by the MMUE and connected AP, establish a communication link with the AP utilizing all or a subset of the jointly supported RATs, and aggregate the traffic streams of simultaneously utilized RATs while the Radio Resource Management (RRM) function at the RAN performs traffic split between simultaneously utilized RATs based on traffic splitting priorities.

In one aspect, a wireless cellular communication system for connecting user equipment is provided, the system comprising a radio access network comprising one or more system radio access points, the system radio access points utilizing a plurality of radio access technologies to connect user equipment, the connected user equipment configured to simultaneously utilize at least two radio access technologies jointly supported by the connected user equipment and the connecting system radio access points.

In another aspect, a method is provided for connecting user equipment to a radio access network comprising one or more system radio access points, the radio access points utilizing a plurality of radio access technologies to connect user equipment is provided, the method comprising configuring the connected user equipment to simultaneously utilize at least two radio access technologies jointly supported by the connected user equipment and the connecting system radio access points.

In a further aspect, a cellular multimode user equipment (MMUE) is provided, the MMUE comprising a processor and a memory, the memory storing instruction which, when executed by the processor, cause the processor to provide a connectivity application software configured to determine a set of radio access technologies (RAT) jointly supported by the MMUE and at least one connected radio access point (AP) and establish a communication link with the AP utilizing all or a subset of the jointly supported RATs.

These and other embodiments are contemplated and described herein. It will be appreciated that the foregoing summary sets out representative aspects of systems and methods for cryptographic suite management to assist skilled readers in understanding the following detailed description.

DESCRIPTION OF THE DRAWINGS

A greater understanding of the embodiments will be had with reference to the Figures, in which.

DETAILED DESCRIPTION

Figure 1:
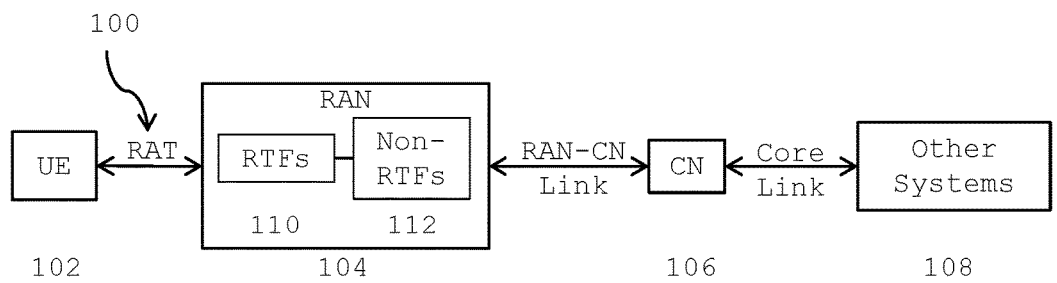
FIG. 1 illustrates an exemplary block diagram of a cellular communication system.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following obviates or mitigates some or all of the foregoing issues, including potentially the underutilization of system radio frequency resources, underutilization of UE capabilities and underutilization of the capabilities of system radio APs. In suitable implementations, the following may provide optimal UE access to system radio frequency resources, full utilization of system radio frequency resources, full utilization of UE capabilities and full utilization of the capabilities of system radio APs.

The following provides a system and method for wireless user equipment access. The system comprises radio APs providing connectivity to UE using a plurality of RATs and MMUE configured to simultaneously utilize all or a subset of RATs jointly supported by MMUE and connecting radio APs. This mode of operation, referred to herein as Multimode Access (MMA), may avoid issues caused by limiting MMUE to utilizing a single-RAT when connecting to system radio APs deploying multiple RATs, a mode of operation referred to herein as Single-Mode Access (SMA). MMUE connecting to system radio APs deploying multiple RATs under MMA may utilize (i) all RATs jointly supported by MMUE and connecting system radio APs; or (ii) a subset of RATs jointly supported by MMUE and connecting system radio APs. In the latter case, MMUE may not utilize all RATs jointly supported by MMUE and connecting system radio APs for various reasons that include, but are not limited to, connectivity requirements of user applications that may not be fulfilled by certain RATs or are better fulfilled by other RATs, energy efficiency considerations and MMUE hardware or processing limitations.

The MMUE comprises a MMUE transceiver module having a processor and a memory, wherein the memory stores instructions which, when executed by the processor, causes the processor to provide connectivity application software.

In one implementation of MMA, the connectivity application software of the MMUE transceiver module is configured to determine a set of RATs jointly supported by the MMUE and connected AP, establish a communication link with the AP utilizing all or a subset of the jointly supported RATs, aggregate the traffic streams of simultaneously utilized RATs and perform traffic split between simultaneously utilized RATs based on traffic splitting priorities.

In another implementation of MMA, the connectivity application software of the MMUE transceiver module is configured to determine a set of RATs jointly supported by the MMUE and connected AP, establish a communication link with the AP utilizing all or a subset of the jointly supported RATs, and aggregate the traffic streams of simultaneously utilized RATs while the Radio Resource Management (RRM) function at the RAN performs traffic split between simultaneously utilized RATs based on traffic splitting priorities.

The connectivity application software aggregates the traffic streams of simultaneously utilized bands. On the other hand, traffic split between simultaneously utilized RATs can be performed, based on pre-set traffic splitting parameters for different user applications, by either the connectivity application software of the UE transceiver module or the RRM function at the RAN. Performing traffic split between simultaneously utilized bands by the connectivity application software of the UE transceiver module reduces the processing load on the RRM. On the other hand, performing the traffic split by the RRM function at the RAN reduces the processing load on the connectivity application software of the UE transceiver module and enables the joint optimization of the overall allocation of system radio frequency resources by accounting for UE capabilities of all system users.

Referring now to FIG. 1, an exemplary network structure for wireless cellular communication systems is shown. The network comprises a Radio Access Network (RAN) (104) linked to a Core Network (CN) (106). The RAN is deployed to wirelessly connect User Equipment (UE) (102) and carry user traffic to the CN (106), where cellular systems are connected with other communication systems (108). A RAN typically comprises radio Access Points (APs) that are deployed at different locations to facilitate connectivity of UE (102), in addition to processing units and equipment (such as antennas, circuits, connecting cables, etc.) that collectively perform Radio Transmission Functions (RTFs) (110) and non-Radio Transmission Functions (non-RTFs) (112). Connection of UE to system radio APs is facilitated by a wireless radio air interface, referred to as the Radio Access Technology (RAT) (100), which utilizes a specific amount of spectrum.

RAN RTFs comprise, but are not limited to: wireless signal transmission and reception, using antennas housed in system radio APs; modulation and demodulation of wireless signals using carrier modem circuits; baseband processing of data using baseband processors; and synchronization of system users in frequency and time using synchronization circuits and signals.

RAN Non-RTFs comprise, but are not limited to: System Access Control (SAC) functions, Radio Resource Management (RRM) functions and User Mobility Management (UMM) functions. SAC functions enable admission of authenticated users to access and utilize system resources using system user registries. RRM functions include determining which system users have access to radio frequency resources at any time using scheduling functions, with opportunistic scheduling commonly employed in data cellular systems to exploit wireless channel variations. UMM functions include maintaining connectivity of mobile users through user connection handover; paging system users to contact the RAN to initiate data transmission sessions; and user location positioning to enable location-based services.

RAN functions (both RTFs and non-RTFs) can be implemented in a single entity or in multiple entities. The Long-Term Evolution (LTE) standard is an example of single entity RAN implementations; as all RAN functions are implemented in a single RAN entity referred to as the enhanced Node B (eNB). On the other hand, The Universal Mobile Telecommunication System (UMTS) system implements RTFs in a RAN element referred to as the Node B (NB) while non-RTFs are implemented in a RAN element referred to as the Radio Network Controller (RNC). Note that RAN functions can be implemented over more than two elements and that both RTFs and non-RTFs can be implemented in any RAN element.

Figure 2:
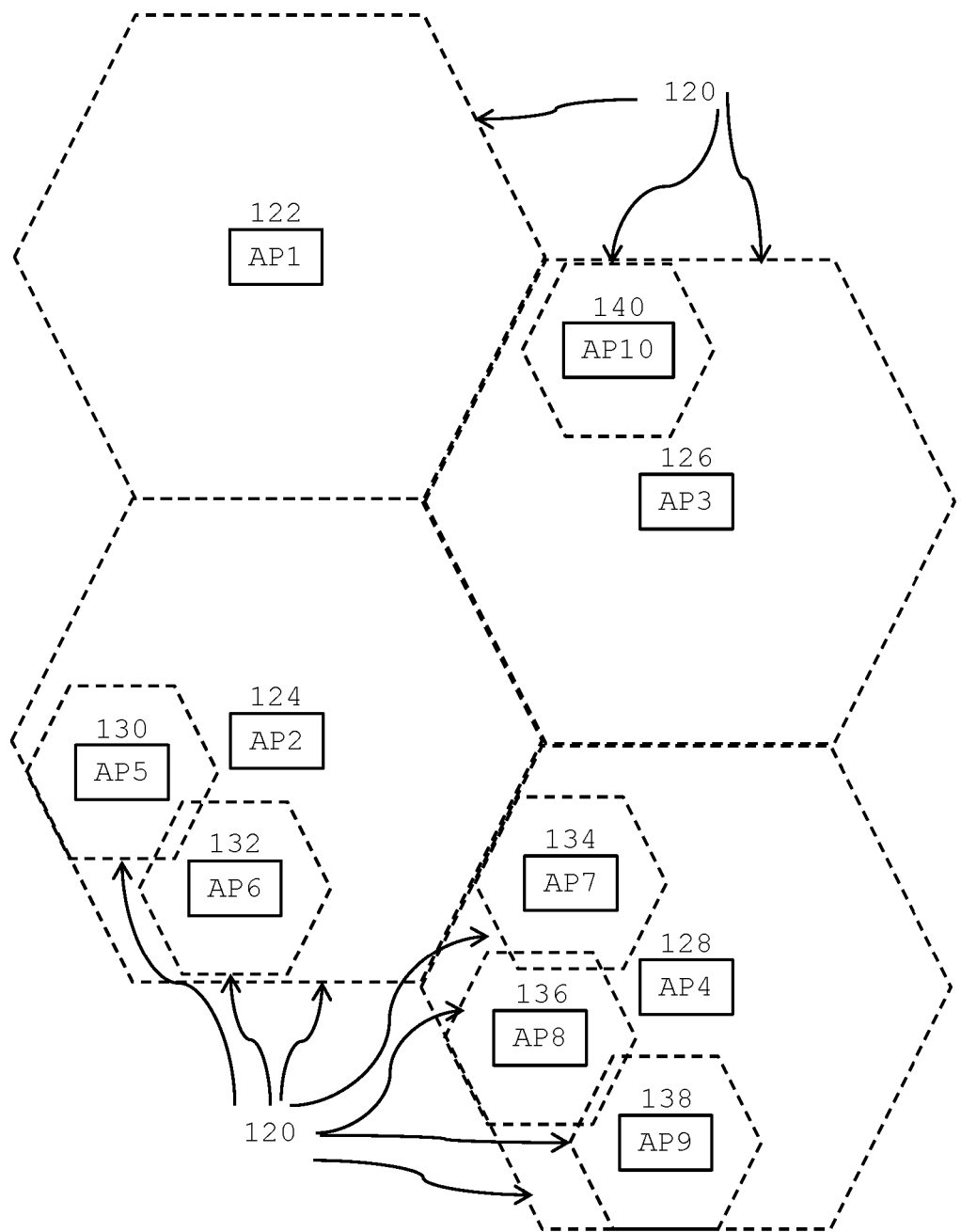
FIG. 2 illustrates a system radio AP layout at a specific geographic area.

The choice of RAT transmission bandwidths and deployment configuration at any system radio AP is dependent on the amount of spectrum available for the mobile network operator deploying the cellular communication system and the interference levels at system radio APs. FIG. 2 illustrates a top view layout of system radio AP deployment comprising ten radio APs deployed at different locations to provide required coverage and capacity at a specific geographical area. The coverage area of radio APs is referred to as cells (120) and is determined by the radio AP transmission power and radio propagation conditions. The coverage area of a radio AP utilizing a particular set of radio frequency resources, i.e. a particular set of carriers, specifies the area in which a radio AP causes significant levels of interference that constrains the reuse of the same set of radio frequency resources by any other radio AP in that area. In the example of FIG. 2, radio APs AP3 (126) and AP10 (140) have overlapping coverage. Similarly, radio APs AP2 (124), AP5 (130) and AP6 (132) also have overlapping coverage. On the other hand, radio APs AP7 (134) and AP9 (138) do not have overlapping coverage and can thus utilize the same set of radio frequency resources at any time. However, the coverage of both radio APs AP7 (134) and AP9 (138) overlaps with the coverage of AP4 (128) and AP8 (136). Therefore, radio APs AP7 (134) and AP9 (138) must both avoid interfering with radio APs AP4 (128) and AP8 (136) at any time. Conversely, the coverage of radio AP AP1 (122) does not overlap with the coverage of any other system radio AP in the example of FIG. 2. All available system radio frequency resources can thus be utilized at AP1 (122) at any time. It should be understood that the provided radio AP deployment layout in FIG. 2 is for illustrative purposes only and that other deployment layouts are contemplated.

In terms of RAT support, UE can be broadly categorized into Single Mode User Equipment (SMUE), capable of utilizing a single RAT only, and Multimode User Equipment (MMUE), capable of utilizing multiple RATs. Variations in the capabilities of UE require the deployment of multiple RATs in cellular communication systems to maintain connectivity of both SMUE and MMUE. This consequently requires the partitioning of spectrum between RATs co-deployed at any system AP and in addition to RATs deployed at system radio APs having overlapping coverage, with each RAT typically assigned one or more blocks of spectrum in most implementations. The transmission bandwidth for each RAT is typically determined at the time of deployment, and perhaps reconfigured from time to time, to reflect typical RAT utilization and traffic demand. A cellular communication system could support one or more RATs and generally assigns bands or sub-bands to each of the employed RATs at system radio APs using a configuration that is typically based on a historical, current and/or projected usage for each RAT such that RATs with higher utilization and traffic demand are assigned more spectrum, and vice versa.

Figure 3:
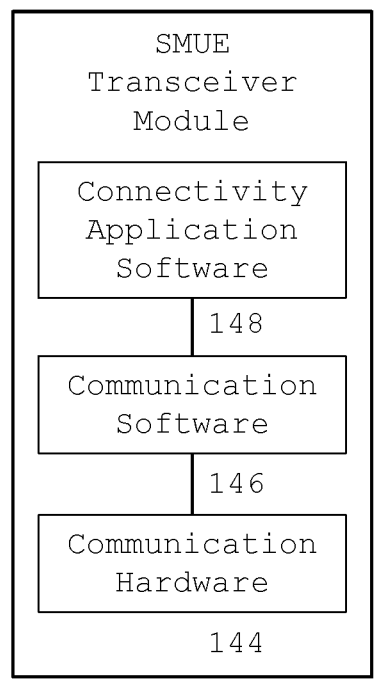
FIG. 3 illustrates an exemplary block diagram of a SMUE.
Figure 4:
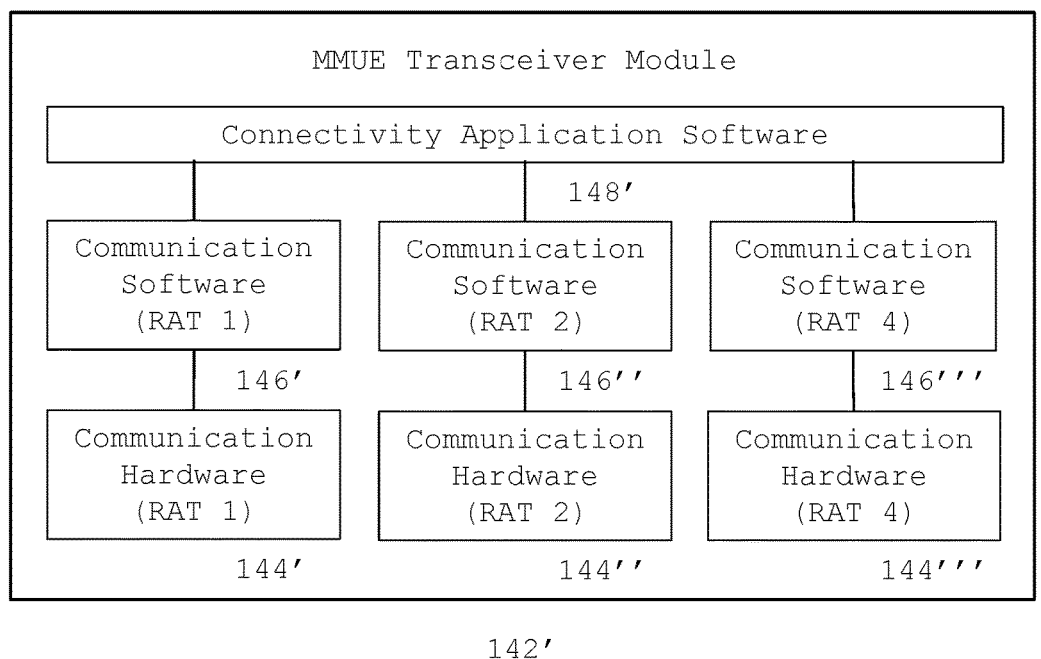
FIG. 4 illustrates an exemplary block diagram of a MMUE.

An exemplary structure of a SMUE transceiver module is shown in FIG. 3. The SMUE transceiver module (142) comprises both dedicated communication hardware (144) and a software component divided into connectivity application software (148) and dedicated communication software (146) specific to the utilized RAT. Subsequently, as FIG. 4 shows, MMUE transceiver modules support multiple RATs by integrating communication processors and software of the supported RATs with the connectivity application software. In the example of FIG. 4, an exemplary structure of a MMUE transceiver module supporting three RATs is shown. The MMUE transceiver module (142') comprises dedicated communication processors for RAT 1 (144'), RAT 2 (144'') and RAT 4 (144''') supplemented by dedicated communication software for RAT 1 (146'), RAT 2 (146'') and RAT 4 (146''') (i.e., RAT 3 is not supported by this MMUE). The connectivity application software (148') is configured to determine RATs supported by the connecting system radio AP(s). It is further configured to establish a communication link with a single or set of system radio APs utilizing a single RAT under SMA and all or a subset of the jointly supported RATs under MMA, and orchestrate the module operation for all supported RATs. Furthermore, the connectivity application software (148') continuously adapts the RAT(s) MMUE utilize to communicate with different system radio APs as well as when the connectivity requirements of user applications change. For example, the connectivity application software (148') may switch the utilized RAT to preserve energy at the UE.

Figure 6:
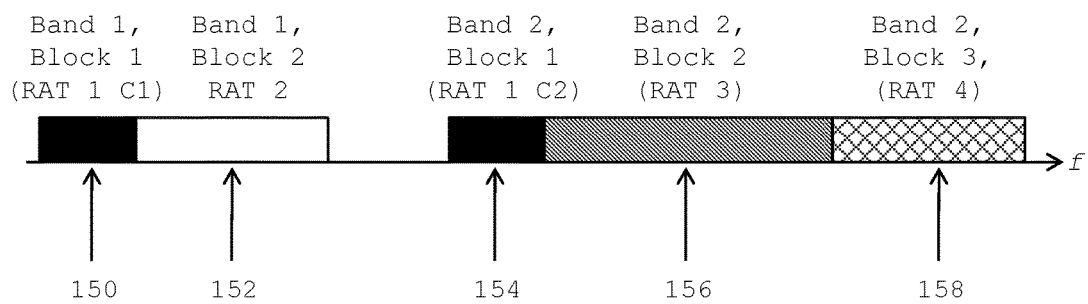
FIG. 6 illustrates an example of wireless spectrum partitioning between multiple RATs.

FIG. 6 shows an example of spectrum partitioning between four RATs deployed in the same geographical area, with RAT performance monotonically increasing (i.e. RAT 4 outperforms RAT 3 and RAT 3 outperforms RAT 2 and RAT 2 outperforms RAT 1). In this example, spectrum at two non-contiguous radio frequency bands, the first comprising two spectrum blocks (150, 152) and the second comprising three spectrum blocks (154, 156, 158), is apportioned between deployed RATs, RAT 1 utilized over two blocks: Block 1 of Band 1 ((Carrier 1 or C1 (150)) and Block 1 of Band 2 (Carrier 2 or C2 (154)), RAT 2 utilized over Block 2 of Band 1 (152), RAT 3 utilized over Block 2 of Band 2 (156) and RAT 4 utilized over Block 3 of Band 2 (158). A possible mapping of the spectrum partitioning of FIG. 6 to the system radio AP layout of FIG. 2 would have all RATs co-deployed over all spectrum blocks (150-158) at AP1 (122), RAT 1 C1 (150) deployed at AP2 (124), AP3 (126), and AP4 (128), RAT 1 C2 (154) and RAT 2 (152) co-deployed at AP5 (130), AP7 (134) and AP9 (138), RAT 3 (156) and RAT 4 (158) co-deployed at AP6 (132) and AP8 (136) and RAT 1 C2 (154), RAT 2 (152), RAT 3 (156) and RAT 4 (158) co-deployed at AP10 (140). It should be understood that the provided spectrum partitioning example in FIG. 6 in addition to the mapping example for the layout of FIG. 2 are for illustrative purposes only and that other contiguous and non-contiguous frequency band plans are contemplated.

UE in cellular communication systems are typically configured to utilize only a single RAT when connecting to system APs. Subsequently, MMUE operating in SMA connecting to system radio APs deploying multiple RATs typically utilize the highest performing RAT jointly supported by MMUE and connecting system radio APs, referred to as the primary mode of operation and typically identified by the connectivity application software of the MMUE transceiver module, with the connectivity application software of the MMUE transceiver module continuously adjusting the utilized RAT as MMUE connect to different system radio APs as well as when the connectivity requirements of user applications change. SMA can result in the suboptimal utilization of system radio frequency resources, MMUE capabilities and capabilities of system radio APs.

Figure 7:
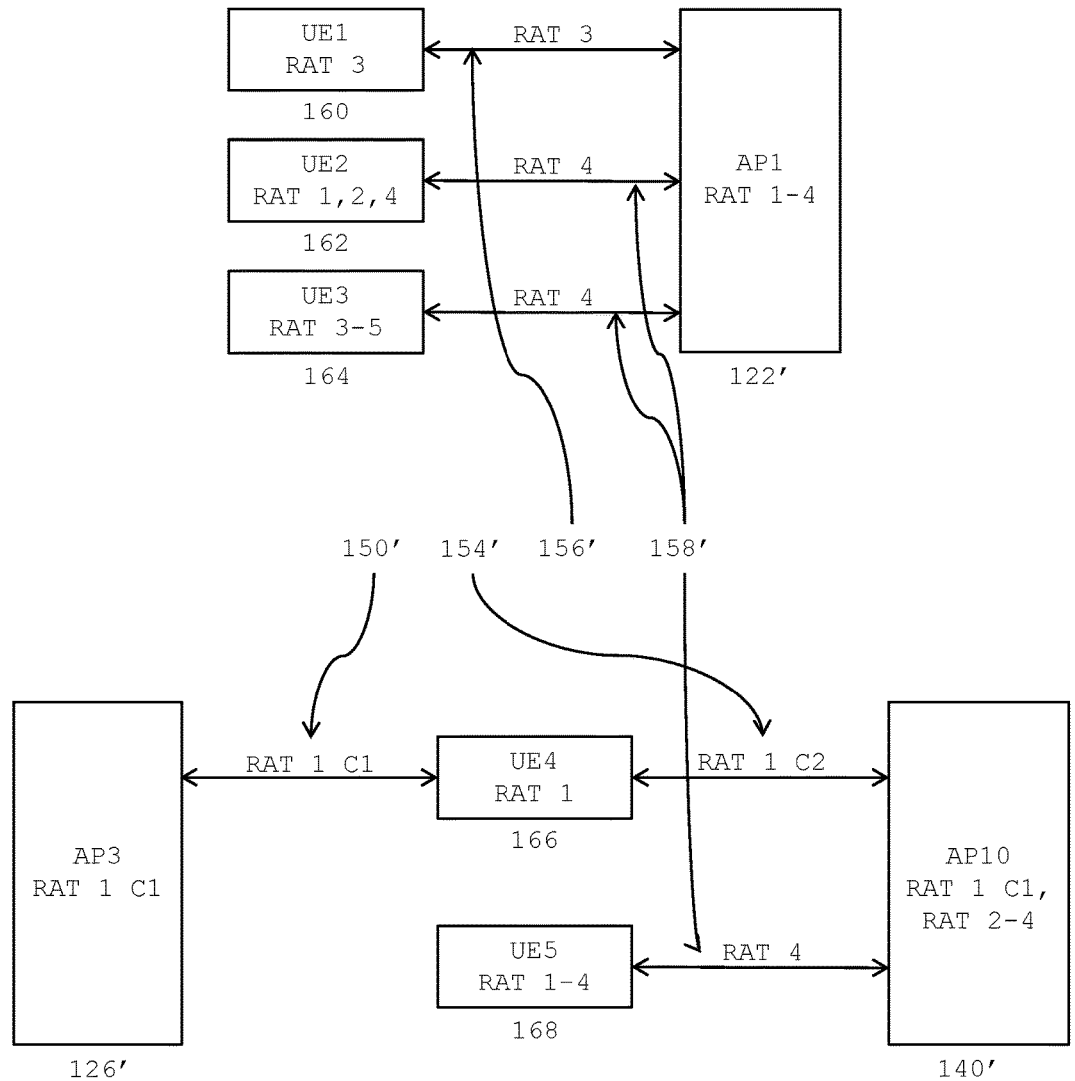
FIG. 7 provides an example of user connectivity under SMA.

Referring now to FIG. 7, an example of five UE, UE1 (160), UE2 (162), UE3 (164), UE4 (166) and UE5 (168), connecting under SMA to three system radio APs adopting the frequency plan based on the system radio AP layout of FIG. 2 and the frequency band plan example of FIG. 6, AP1 (122'), AP3 (126') and AP10 (140'), is provided. All RATs co-deployed over all spectrum blocks (150-158) at AP1 (122'), RAT 1 C1 (150) is deployed at AP3 (126') and RAT 1 C2 (154), RAT 2 (152), RAT 3 (156) and RAT 4 (158) co-deployed at AP10 (140'). In this example, UE1 (160), UE2 (162) and UE3 (164) connect to AP1 (122') while UE4 connects to AP10 (140') and UE5 (168) simultaneously connects to AP3 (126') and AP10 (140'). While SMUE are capable of utilizing a single RAT only when connecting to system radio APs, the constraint of SMA limits MMUE connectivity to system APs to the primary mode of operation, i.e. a single RAT only. Specifically, UE1 (160) connects to AP1 (122') using RAT 3 (156'), UE2 (162) connects to AP1 (122') using RAT 4 (158'), UE3 (164) connects to AP1 (122') using RAT 4 (158'), UE4 simultaneously connects to AP3 (126') using RAT 1 C1 (150') and AP10 (140') using RAT 1 C2 (154') while UE5 (168) connects to AP10 (140') using RAT 4 (158'). Therefore, in the example of FIG. 7, system radio frequency resources assigned to RAT 1 (150, 154) and RAT 2 (152) at AP1 (122') are completely unutilized in spite of connecting a UE, UE2 (162), capable of utilizing RAT 1 (150, 154) and RAT 2 (152). Similarly, system radio frequency resources assigned to RAT 2 (152) and RAT 3 (156) are completely unutilized at AP10 (140') in spite of connecting UE5 (168) capable of utilizing RAT 2 (152) and RAT 3 (156). While the example of FIG. 7 clearly illustrates the aforementioned limitations imposed by SMA, it should be understood that the configuration provided in FIG. 6 is for illustrative purposes only and that other configurations are contemplated.

Figure 8:
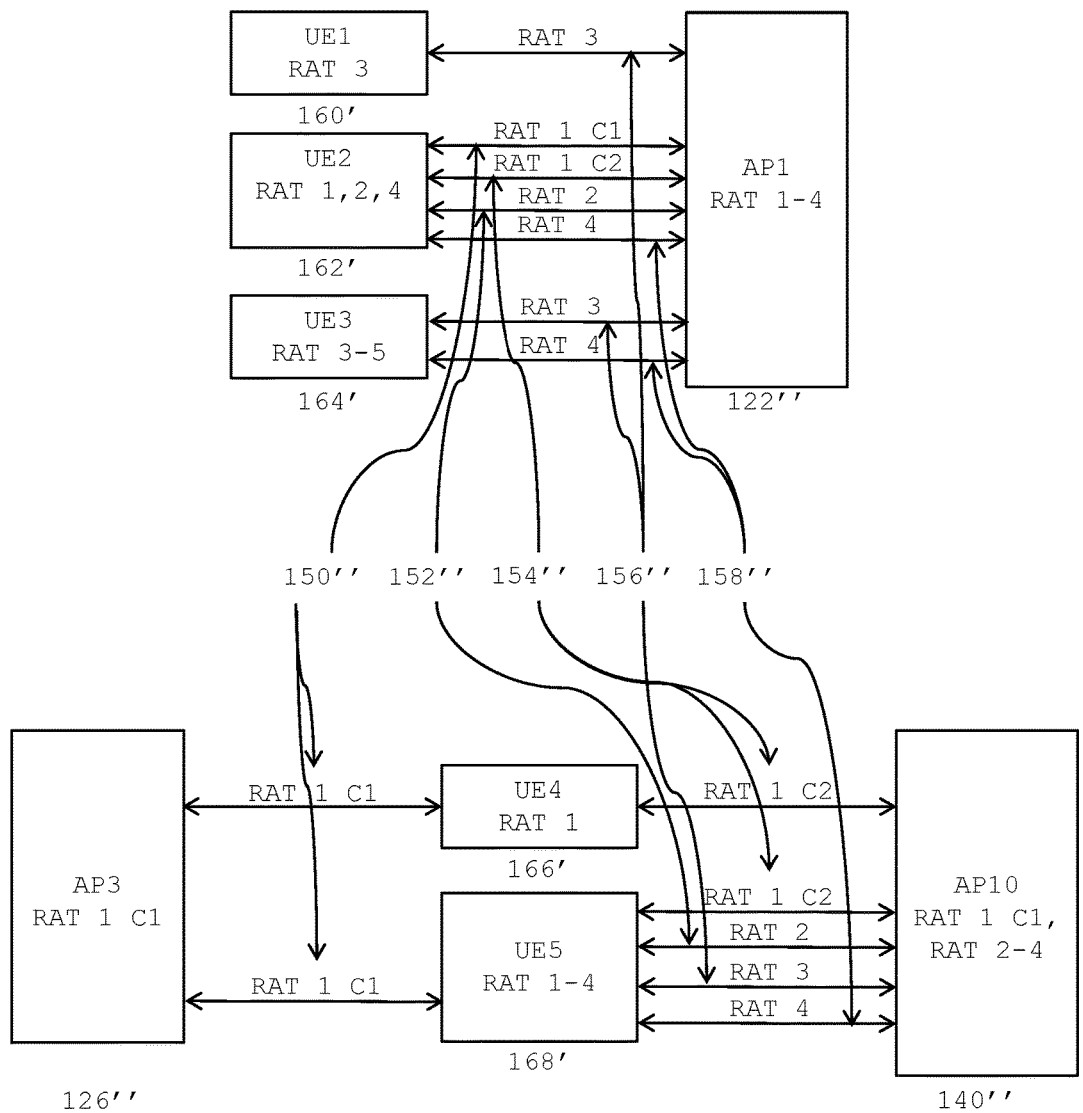
FIG. 8 provides an example of user connectivity under MMA.

To circumvent the limitations of SMA, MMUE are allowed to simultaneously utilize all RATs jointly supported by MMUE and connecting radio APs under Multimode Access (MMA). To illustrate UE connectivity under MMA and contrast MMA to SMA, FIG. 8 illustrates UE connectivity under MMA for the same UE and system radio AP configuration provided in FIG. 7. Connectivity of UE1 (160') to AP1 (122'') is unaffected by the enablement of MMA as UE1 (160') is capable of utilizing a single RAT only (RAT 3 (156'')). On the other hand, UE2 (162') simultaneously utilizes all RATs jointly supported by UE2 (162') and AP1 (122'') (RAT 1 (150'', 154''), RAT 2 (152'') and RAT 4 (158'')) when connecting to AP1 (122''). Similarly, UE3 simultaneously utilizes RAT 3 (156'') and RAT 4 (158'') when connecting to AP1 (122''). Similar to UE1 (160'), UE4 (166') is unaffected by the enablement of MMA and utilizes RAT 1 C1 (150'') to connect to AP3 (126'') while simultaneously connecting to AP10 (140") using RAT1 C2 (154"). Conversely, UE5 (168') connects to AP3 (126") using RAT1 C1 (150") while simultaneously connecting to AP10 (140") using RAT 1 C2 (152"), RAT 2 (152"), RAT 3 (156"), and RAT 4 (158"). When compared to the example of FIG. 7, system radio frequency resources are fully utilized at all system radio APs under MMA as opposed to being partially utilized under SMA. Once again, it should be understood that the example provided in FIG. 8 is for illustrative purposes only and that other configurations are contemplated.

Figure 5:
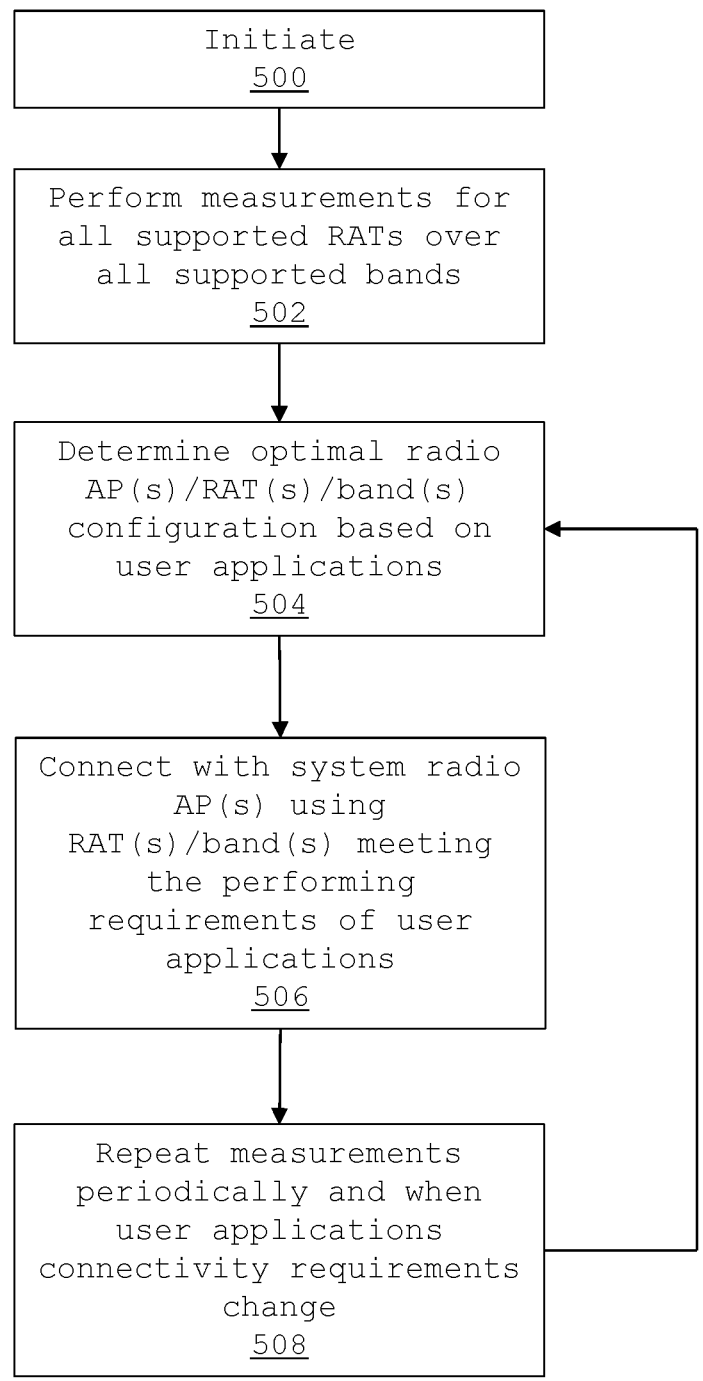
FIG. 5 provides a flowchart illustrating the operation of the connectivity application software of MMUE.

FIG. 5 illustrates exemplary operation of the connectivity application software of MMUE in MMA. At block 500, the connectivity application software is initialized in response to a user application requiring a data connection. At block 502, the connectivity application software performs measurements for all supported RAT(s) over all supported bands to determine the performance capabilities of the RAT(s). At block 504, the connectivity application software determines the optimal radio AP(s), RAT(s) and band(s) to utilize based on the needs of the particular user application and the performance capabilities previously determined. At block 506, the connectivity application software causes the MMUE to establish a connection to each APs using the selected RAT(s) and band(s). At block 508, the connectivity application software performs the measurements of block 502, and blocks 504, 506 and 508 repeat during the course of connectivity.

Therefore, the utilization of system radio frequency resources, in addition to the utilization of UE capabilities and system radio AP capabilities, is substantially improved with the enablement MMA.

While MMA enables MMUE to simultaneously utilize all RATs jointly supported by MMUE and connecting system radio APs, MMUE may utilize a subset of RATs jointly supported by MMUE and connecting system radio APs for various reasons that include, but are not limited to, cost considerations, connectivity requirements of user applications that may not be fulfilled by certain RATs or are better fulfilled by other RATs, energy efficiency considerations and MMUE hardware or processing limitations. Traffic split between simultaneously utilized RATs is thus based on the traffic demand of user applications, the connectivity requirements of user applications, the traffic capacity of utilized RATs in addition to traffic splitting priorities. For example, if the user application traffic demand can be met by utilizing one of two RATs only and energy efficiency is prioritized then user traffic may be carried using the most energy efficient RAT of the two RATs capable of meeting user application traffic demand. In another example, traffic may be split between three RATs to achieve better energy efficiency when compared to utilizing a single RAT. It must be appreciated that such examples are for clarification purposes only and that other traffic split considerations and implementations are contemplated.

Similar to multi-band connectivity, the connectivity application software of the MMUE transceiver module aggregates traffic streams of simultaneously utilized RATs while traffic split between simultaneously utilized RATs can be performed, based on pre-set traffic splitting parameters for different user applications, by either the connectivity application software of the MMUE transceiver module or the RRM function at the RAN. Performing traffic split between simultaneously utilized RATs by the connectivity application software of the MMUE transceiver module reduces the processing load on the RRM function at the RAN, and thus avoids imposing any implementation requirements on the RAN when transitioning from SMA to MMA. In contrast, performing the traffic split by the RRM function at the RAN reduces the processing load on the connectivity application software of the MMUE transceiver module and enables the joint optimization of the overall allocation of system radio frequency resources by accounting for UE capabilities of all system users. Similar to multi-band connectivity, traffic split mechanisms include, but are not limited to, sequential and weighted traffic split. Under sequential traffic split, traffic demand is steered at a designated RAT and traffic demand exceeding the capacity provided by the designated RAT is steered at another designated RAT and so on. On the other hand, weighted traffic split divides traffic between RATs based on RAT capacity and packet latency, such that RATs providing equal capacity and packet latency would carry equal amounts of traffic.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

We claim:

1. A wireless cellular communication system for connecting user equipment, the system comprising a cellular communication radio access network comprising one or more system radio access points, the system radio access points utilizing a plurality of radio access technologies to connect user equipment to the cellular communication radio access network, the connected user equipment configured to connect to the cellular communication radio access network by simultaneously utilizing at least two cellular communication radio access technologies jointly supported by the connected user equipment and the connecting system radio access points, traffic splitting of user traffic is performed between the simultaneously utilized cellular communication radio access technologies based on traffic splitting priorities and aggregates traffic streams from simultaneously utilized cellular communication radio access technologies, the traffic splitting is performed by a radio resource management (RRM) function on the radio access network or by a connectivity application software on the user equipment.

2. The system of claim 1, wherein the connected user equipment simultaneously utilizes all cellular communication radio access technologies jointly supported by the connected user equipment and the connecting system radio access points.

3. The system of claim 1, wherein the connected user equipment simultaneously utilizes a subset of cellular communication radio access technologies jointly supported by user equipment and the connecting system radio access point.

4. The system of claim 3, wherein the cellular communication radio access network performs the traffic split between the simultaneously utilized subset of cellular communication radio access technologies and aggregates the traffic streams from the simultaneously utilized subset of cellular communication radio access technologies.

5. The system of claim 1, wherein the at least two cellular communication radio access technologies are provided by one radio access point and the connected user equipment connects to the one radio access point.

6. The system of claim 1, wherein the at least two cellular communication radio access technologies are provided by a plurality of radio access points and the connected user equipment simultaneously connects to the plurality of radio access points.

7. A method for connecting user equipment to a cellular communication radio access network comprising one or more system radio access points, the radio access points utilizing a plurality of cellular communication radio access technologies to connect user equipment, comprising configuring the connected user equipment to connect to the cellular communication radio access network by simultaneously utilizing at least two cellular communication radio access technologies jointly supported by the connected user equipment and the connecting system radio access points, traffic splitting of user traffic is performed between the simultaneously utilized cellular communication radio access technologies based on traffic splitting priorities and aggregates traffic streams from simultaneously utilized cellular communication radio access technologies, the traffic splitting is performed by a radio resource management (RRM) function on the radio access network or by a connectivity application software on the user equipment.

8. The method of claim 7, wherein the connected user equipment simultaneously utilizes all cellular communication radio access technologies jointly supported by the connected user equipment and the connecting system radio access points.

9. The method of claim 7, wherein the connected user equipment simultaneously utilizes a subset of cellular communication radio access technologies jointly supported by user equipment and the connecting system radio access point.

10. The method of claim 9, wherein the cellular communication radio access network performs the traffic split between the simultaneously utilized subset of cellular communication radio access technologies and aggregates the traffic streams from the simultaneously utilized subset of cellular communication radio access technologies.

11. The method of claim 7, wherein the at least two cellular communication radio access technologies are provided by one radio access point and the connected user equipment connects to the one radio access point.

12. The method of claim 7, wherein the at least two cellular communication radio access technologies are provided by a plurality of radio access points and the connected user equipment simultaneously connects to the plurality of radio access points.

13. A cellular multimode user equipment (MMUE) comprising a processor and a memory, the memory storing instruction which, when executed by the processor, cause the processor to provide a connectivity application software configured to determine a set of radio access technologies (RAT) jointly supported by the MMUE and at least one connecting system radio access point (AP) and establish a communication link with the system radio AP over a single cellular communication radio access network, the single cellular communication radio access network utilizing two or more of the jointly supported RATs, the connectivity application software is further configured to aggregate the user traffic streams of simultaneously utilized RATs and perform traffic splitting between simultaneously utilized RATs based on traffic splitting priorities.

14. The system of claim 1, wherein the traffic splitting between the simultaneously utilized cellular communication radio access technologies comprises sequential traffic splitting.

15. The system of claim 1, wherein the traffic splitting between the simultaneously utilized cellular communication radio access technologies comprises weighted traffic splitting.

16. The method of claim 7, wherein the traffic splitting between the simultaneously utilized cellular communication radio access technologies comprises sequential traffic splitting.

17. The method of claim 7, wherein the traffic splitting between the simultaneously utilized cellular communication radio access technologies comprises weighted traffic splitting.

* * * * *